United States Patent Office 3,202,379
Patented Aug. 24, 1965

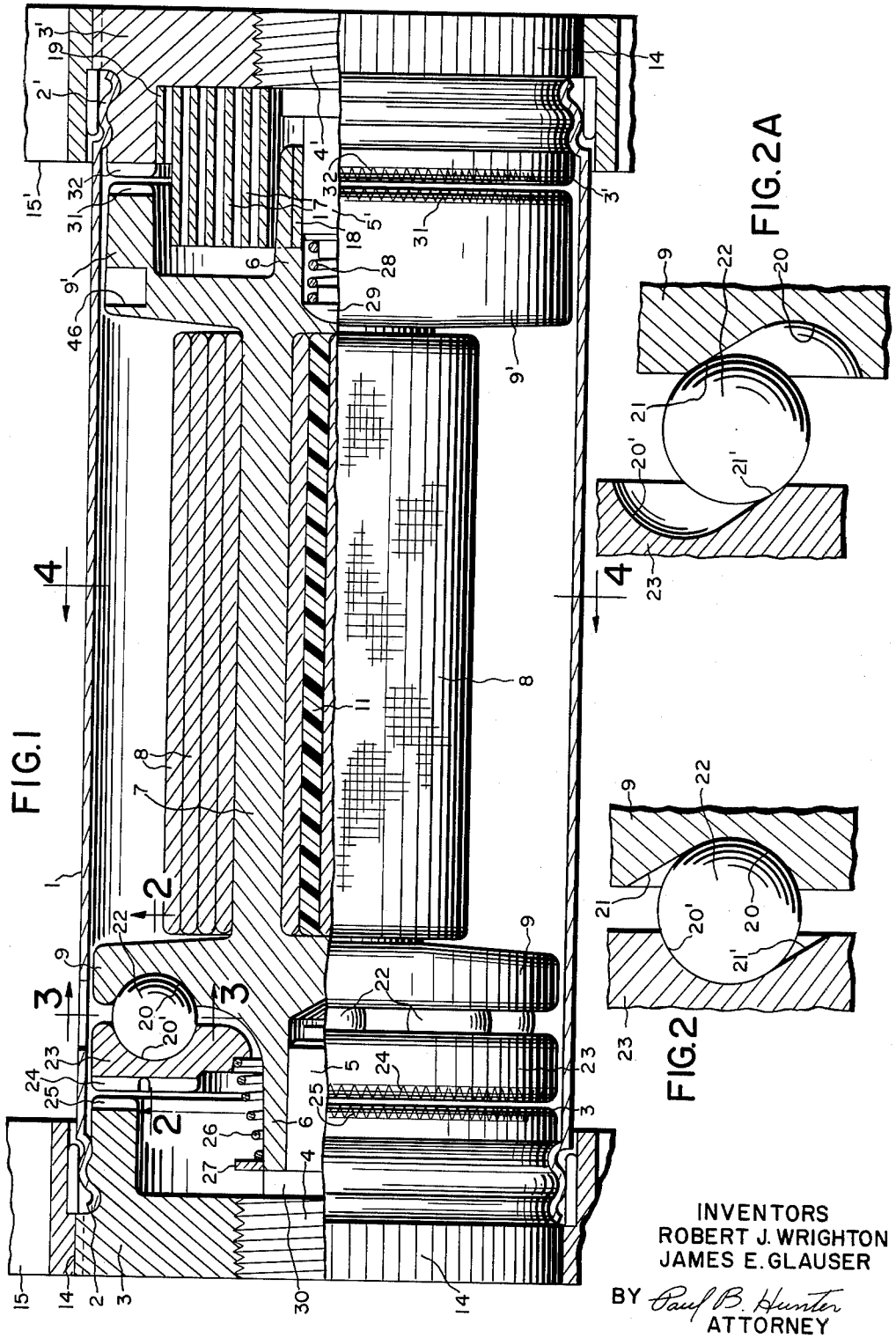

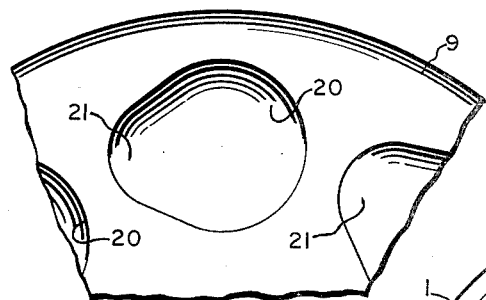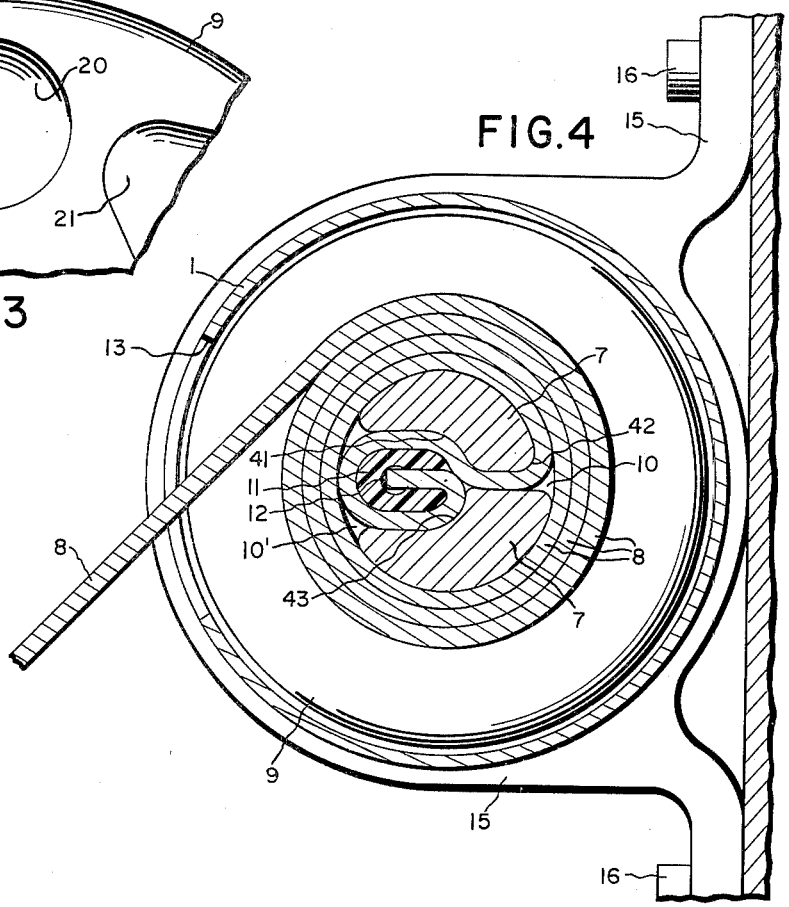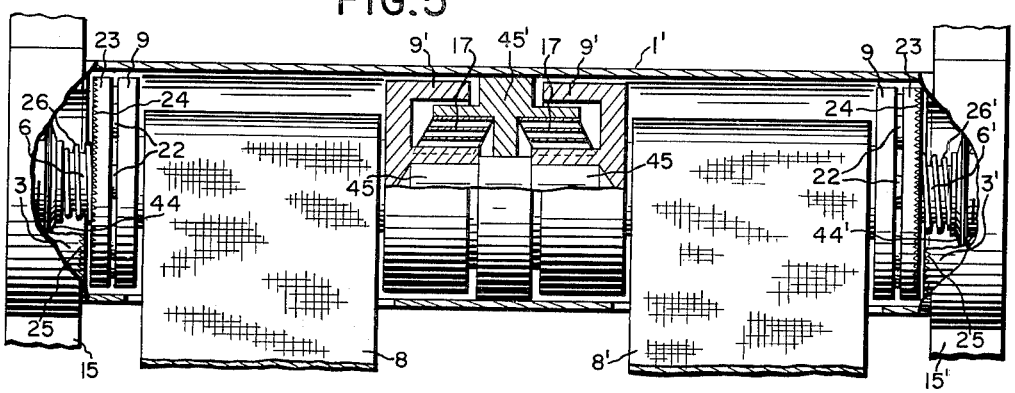

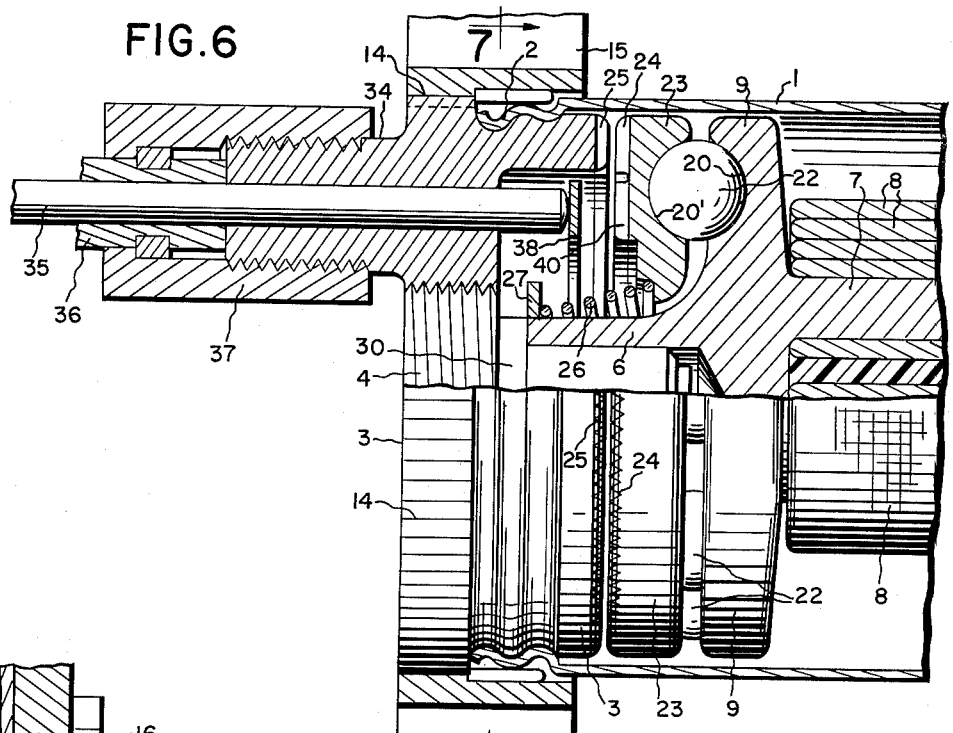
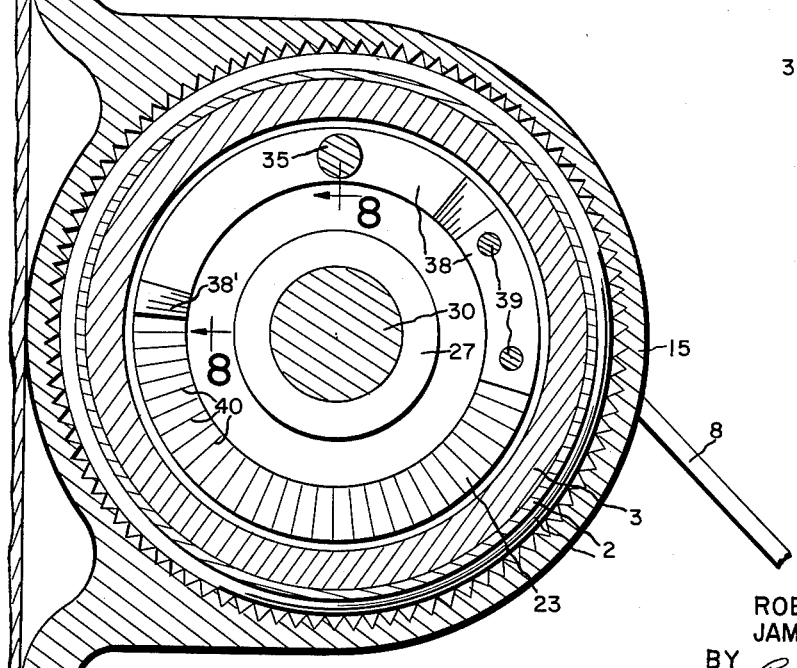
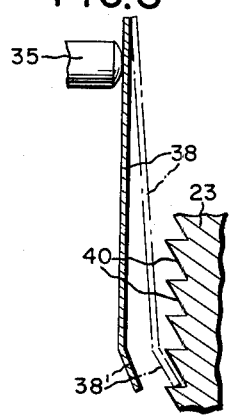
INVENTORS
ROBERT J. WRIGHTON
JAMES E. GLAUSER

3,202,379
SAFETY HARNESS DEVICE
Robert J. Wrighton, Newport Beach, and James E. Glauser, Downey, Calif., assignors to Pacific Scientific Company, San Francisco, Calif., a corporation of California
Filed Apr. 1, 1963, Ser. No. 269,633
5 Claims. (Cl. 242—107.4)

This invention relates generally to a novel safety harness device for use by pilots, operators, and other crew members such as bombardiers, navigators, and gunners, etc., as well as by passengers of rapidly moving vehicles such as aircraft and automobiles, and more particularly to a novel inertia operated, acceleration responsive safety harness device which operates to automatically retain the user in his seat during crashes and the like.

Safety devices of the general type herein involved have been developed over the years, and one of the inventors hereof has been exceedingly active in this field and was a co-inventor, for example, in Patent No. 2,845,233 disclosing a safety device of the general type to which the present invention relates.

The devices as heretofore constructed have tended to become more and more complicated, and, while such complications do add to the over-all proficiency, safety and reliability of such devices, such complications tend to increase the cost of the same so that these devices are not generally available for many applications where cost is important.

The principal object of the present invention is to provide a novel, light weight, and relatively inexpensive safety harness device that is especially suitable for use on helicopters, executive airplanes, automobiles, etc., the said device being exceedingly rugged and reliable in use.

A feature of the present invention is to provide a novel safety harness device of the above character wherein the reel carrying the strap or other tension member for passing over or connecting to the body of the user is designed to be fastened to both ends of the casing in event of its locking in operation, thereby providing an extremely rugged and reliable lock and eliminating high torsional loads on the shaft.

Another feature of the present invention is to provide a novel safety device of the above character employing metal balls acting as the inertia means and also the actuating means for effecting the locking of the device in use, thus retaining the user in his seat in the event of a crash, the said balls being disposed so as to effect uniform and reliable locking through their inertial force in the event of an accident tending to cause the user's body to be thrown from the seat, the said device, however, permitting normal movement of the shoulder harness or safety strap and hence of the upper portion of the user's body during normal motions of the vehicle.

Another feature of the present invention is to provide a novel safety device of the above character that is adapted to be locked manually if desired and is also adapted to employ dual straps instead of a single strap, also when desired.

These and other features and advantages of the present invention will become more apparent after a perusal of the following specification taken in connection with the accompanying drawings wherein:

FIG. 1 is an enlarged side view of the novel safety harness device of this invention with parts broken away to illustrate the interior construction thereof;

FIG. 2 is an enlarged sectional view taken along line 2—2 of FIG. 1 showing the position of one of the inertia balls employed in the device in position during normal operation of the same, in which position the user is free to move his shoulders away from his seat back at will;

FIG. 2A is a view similar to FIG. 2 but shows the action of one of the inertia balls during a sudden acceleration of the strap of the device with the user restricted from moving away from his seat as during a crash;

FIG. 3 is an enlarged fragmentary sectional view taken along line 3—3 of FIG. 1 and showing the configuration of the ball sockets;

FIG. 4 is a sectional view taken along line 4—4 of FIG. 1;

FIG. 5 is a side view with parts broken away of the novel safety device employing two straps or tension members instead of one;

FIG. 6 is a partial sectional view of the structure of FIG. 1 modified to employ a manual locking feature;

FIG. 7 is a sectional view taken along line 7—7 of FIG. 6; and

FIG. 8 is an enlarged sectional view taken along the arcuate line 8—8 of FIG. 7.

Similar characters of reference are used in the above figures to designate corresponding parts.

Referring now to FIGS. 1 through 4 of the drawings of this invention, the reference numeral 1 designates the casing of the device which may be of cylindrical or tubular shape and has its end portions similarly crimped at 2 and 2' for conformably fitting tightly into annular slots in end caps 3 and 3'. The crimped ends 2 and 2' will rigidly retain the end caps 3 and 3' upon the end portions of the case 1 and prevent any relative axial movement of the end caps in use. Studs 4 and 4' are threaded or molded into central apertures provided in end caps 3 and 3' and have reduced, inwardly directed bearings 5 and 5' upon which the hollow end portions of a reel 6 are mounted to enable relative rotation of the reel upon the bearings. The reel 6 is of generally spool shape having a central, substantially cylindrical shaft portion 7 upon which a strap or other tensile member 8 is wound. The ends of the central shaft portion 7 are defined by cylindrical collars 9 and 9' forming therewith the reel 6, which collars serve to retain the strap 8 axially in place upon the central shaft portion 7 of the reel 6.

The inner end of the strap 8 is adapted to be attached to the shaft portion 7 by novel means better illustrated in FIG. 4. The shaft portion 7 is provided with a transverse slot 10 having an enlarged portion 10' for receiving an insert member 11 as of plastic. The walls of slot 10 are curved at 41, 42, and 43 to produce snubbing friction as will further appear. This insert is substantially oval shaped and has a slot 12 cut in from one side thereof. The insert member is so designed that the strap 8 can be either removed from the shaft portion 7 or attached thereto without disassembling the safety device. To do this, first the reel or spool 6 must be rotated to wind up the spring 17. Hole 46, FIG. 1, is provided to retain the reel by use of a suitable tool when spring 17 is tensioned. Assuming there is no strap on the shaft, the strap end is first inserted through a slot 13 in the wall of the casing 1 and transversely through the narrow portion of slot 10 of reel 6. The end of the strap which is cut with a hot blade that raises a slight burr on the cut edge of the strap, is first slid into the slot in insert 11 exteriorly of shaft 7. The inner portion of the insert slot 12 is slightly enlarged as shown in the drawing, so that the burred end of the strap is retained therein, whereupon the insert 11 is rolled through one revolution, and then the insert 11 with the strap end portion wound thereon is inserted into the enlarged portion 10' of transverse slot 10 of shaft 6. Thus, with the strap end portion wrapped completely around the insert 11 as shown in FIG. 4, the assembly fits conformably and snugly within the enlarged portion 10' of the slot 10, and when tension is applied to the strap 8 the snubbing action of the multiple turns of the strap upon the insert 11 and upon the conforming wall surfaces 41, 42, and 43 of aperture 10 serves to keep the strap from being pulled out of the shaft and, in fact, the greater the stress applied to strap 8 the tighter the grip of the insert 11 and reel 6 upon the strap, due to this snubbing action.

With this design, in case the strap 8 should become worn, a new strap can be readily inserted without disassembly of the device. The strap 8 is adapted to either extend directly over the shoulders of the user or, more likely, to be connected to additional straps as illustrated in Patent No. 2,845,233, which extend over the shoulders of the user. The strap 8 is normally kept wound up upon the central shaft portion 7 of reel 6 by the action of a spiral rewind spring 17 which is hooked as at 18 to the reel 6 and as at 19 to the end cap 3'. This spring acts to urge the reel 6 in the direction to rewind the strap upon the shaft central portion 7. The shaft cylindrical collar or flange 9 is provided with a series of mutually angularly spaced ball recesses or sockets 20 having tapered portions 21 (see FIG. 3) for receiving inertia balls 22 as of steel. The balls 22 also are adapted to project into similar sockets or recesses 20' of a ring shaped thrust plate or member 23 which is disposed in opposition to the collar and axially movable with respect thereto. It will be noted that the ball recesses 20' of the thrust plate 23 are also provided with tapered portions 21' which are angularly displaced with respect to the tapered portions 21 of the collar 9. In other words, as viewed in FIG. 2, tapered portions 21 and 21' are on opposite side of balls 22. It will be noted that the thrust plate 23 is disposed between the collar 9 and the end cap 3 and the face of thrust plate 23 opposed to end cap 3 is provided with a series of serrations or gripping means 24 for meshing with similar serrations or gripping means 25 provided on the end cap 3 should the thrust plate 23 be moved longitudinally into engagement with end cap 3, which occurs during the locking of the device, as will further appear.

The thrust plate 23 is continuously urged toward collar 9 by means of a coil spring 26 which surrounds the hollow end portion of shaft 6 and bears at one end against a collar 27 on this shaft and at its other end against the thrust plate 23. The thrust of spring 26 is checked on assembly and the setting of this thrust determines the strap acceleration at which locking of the device occurs, as will also further appear. A coil spring 28 is contained within the hollow right hand end of shaft 6, as viewed in FIG. 1, and presses at one end against the bearing extension 5' of stud 4' and at its other end against a thrust member 29 which in turn bears axially against the reel 6, thereby urging the reel toward the left as viewed in this figure, so that during normal operation of the device the left hand end of reel 6 abuts a step 30 provided on the stud 4.

The collar 9' is provided with a series of serrations 31 near its periphery for engaging with similar serrations 32 formed on the end cap 3' when the device is locked, as will further appear. Normally the spring 28 urging reel 6 toward the left as viewed in FIG. 1 bottoms this reel out against step 30 so that serrations 31 and 32 do not engage. Similarly, with the reel thus positioned, it will be noted that serrations 24 on the thrust plate do not engage serrations 25 on end cap 3. The end caps 3 and 3' of casing 1 are similar in FIG. 1 and are provided with peripheral serrations or teeth 14 which mate with similar serrations on mounting brackets 15 and 15', the latter having upper and lower apertured lugs which are attached as by bolts 16, preferably to the back of the user's seat or an extension thereof.

In operation, during normal movements of the user, the strap 8 is pulled out by the user when he leans forward in the seat, causing spring 17 to yield and unwind the strap 8 from the reel 6, the thrust plate 23 turning with the reel, and when the user moves back in his seat the spring 17 rewinds strap 8 upon the reel. However, in the event of a crash resulting in sudden deceleration of the vehicle, the user's body tends to be thrown forward suddenly so that the strap starts to pay out of the casing 1 with acceleration. Depending upon the preset tension of the spring 26, if a predetermined dangerous acceleration of the user's body is reached, the balls 22 will tend to lag behind the rotating collar 9 so that, as shown in FIGS. 2 and 2A, these balls will ride out along the inclined portion 21 and 21' of recesses 20 and 20', thereby forcing the thrust plate 23 toward the left as viewed in FIG. 1 against the tension of spring 26 and subsequently forcing the reel 6 towards the right against the tension of spring 28, so that almost instantly serrations 24 mesh with serrations 25 and serrations 31 mesh with serrations 32, thereby gripping or holding the thrust plate 23 in engagement with end cap 3 and hence stopping further rotation of the reel at that end, while the meshing of teeth 31 and 32 stop the rotation of the reel at its other end so that the reel is held firmly at both ends, relieving the shaft 6 of high torsional loads and enabling the device to withstand enormous strap stresses in use. FIG. 2A shows the position of the balls when the device is locked. If desired, rollers or cam shaped turnable members and conforming sockets could be used in lieu of balls 22. Also, friction surfaces could be used in lieu of serrations 24 and 25.

Once the force against the strap 8 is relieved, then it will retract automatically through the action of rewind spring 17. As the spring starts to rewind, the flange 9 will reverse its direction so that balls 22 re-enter the deep portion of sockets 20, thereby permitting springs 26 and 28 to center the reel 6 and disengaging serrations 31 and 32 and serrations 24 and 25, so that the parts return to their positions as shown in FIG. 1. There is no possibility of the device locking during wind-up and even with rapid wind-up of the strap because, as is seen from FIG. 2, collar 9 will move in the opposite direction from that shown by the arrow in which direction it is impossible for the balls to ride out the untapered portions of their sockets, so that the device can only lock on the predetermined extension or outward acceleration of the strap. Thus, it is seen that no manual control is required to unlock the reel and return the strap into its casing, as is usually required in this type of device.

In some instances a manual lock of the device may be desired, and this is provided for in the construction shown in FIGS. 6 through 8. This structure is similar to that in FIGS. 1 through 4 except that the end cap 3 in these figures is provided with an external hollow threaded boss 34 through which a push-pull flexible shaft 35 extends, said shaft having a flexible sheath casing 36 retained upon the boss 34 by means of cap 37. An arcuate leaf spring 38 has one end portion thereof secured as by rivets 39 to the inner surface of the end cap 3, while the other end portion thereof is free and is adapted to be moved into engagement with teeth 40 provided on the face of thrust plate 23 by shaft 35, teeth 40 having straight and inclined sides. The teeth 40 are shaped so that their straight sides abut the end 38' of spring 38 when this spring is held against the thrust plate and the strap 8 pulled outwardly, thus holding the thrust plate against turning with flange 9.

Thus, when the shaft 35 is pushed inwardly by a control handle located adjacent to the seat, such as shown in Patent No. 2,845,233, this shaft 35 will act to deflect spring 38 towards the teeth 40 causing the loose end 38' thereof to engage and abut the straight side of one of these teeth. With the manual control in this position, if tension is applied to strap 8 and the thrust plate 23 is thusly restrained against rotation by the spring 38, reel flange 9 will turn and roll the balls 22 outwardly of their sockets and force the thrust plate to its locked position and also effect the locking of the opposite end of reel 6. The torsional loads thus induced in the end caps are transmitted directly into the mounting brackets 15 and 15' through the serrations 14. The axial forces on the end caps produced by the balls and ball sockets is resisted by the tubular casing 1 that is crimped at 2 and 2' to the end caps.

If tension is removed from the strap with the control in the manual locked position, the strap will retract as the result of the action of spring 17, the spring 30 meanwhile riding over the inclined ends of teeth 40 of the thrust plate as such retraction occurs. Any attempt to extend the strap will result in the mechanism going back into the locked position. When the control is unlocked, i.e., when shaft 35 is retracted, the spring 38 completely clears the thrust plate 23, even if this plate is in the locked position.

In instances where it is desired to use dual straps within the safety harness device, the structure shown in FIG. 5 is employed. In this structure two reels 6 and 6' are shown mounted end to end or in line. Reel 6 is similar to the reel of FIG. 1 with the exception that no teeth such as 31 and 32 shown in FIG. 1 are employed on the flange 9' of the reel of FIG. 5. Instead, flange 9' of reel 6 is opposite the flange 9' of the aligned reel 6' with a bearing partition 45' therebetween fixed to casing 1'. The inertia locking mechanism of reel 6' is sensitive to acceleration in the opposite direction to that of the reel in 6, as is necessary in use. This means that the ball sockets 20 and 20' are oppositely tapered in reel 6' from reel 6, as will be apparent. Leaf centering springs 44 and 44' are located adjacent the outer ends of said reels between the end caps 3 and 3' and the shafts 6 and 6'. Normally, springs 44 and 44' are not loaded and merely maintain clearance between the serrations or projections on thrust plates 23 and end caps 3 and 3'. However, should rapid pay-out resulting in excessive acceleration of strap 8 of reel 6 take place, for example, the thrust of balls 22 not only engages teeth 24 and 25 of reel 6 but the end thrust on the shaft of this reel exerted through bearing stub thrust shaft 45, that supports the ends of the reel shafts 6 and 6' upon bearing partition 45', will deflect centering spring 44' and move reel 6' towards the right, as viewed in FIG. 5, thereby causing teeth 24 and 25 of this reel to lock likewise so that the outer ends of both reels will lock against their casings, thereby providing a rigid support for the extended straps 8 and 8'.

Since many changes could be made in the above construction of the novel safety harness device of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A harness device comprising a reel having spaced annular collars, a casing for said reel having spaced bearings supporting said reel while permitting rotation and limited axial movement thereof, a strap confined between said collars and wound upon said reel, said strap extending outwardly of said casing for connection to the body of the user, a rewind spring connected between said casing and said reel permitting unwinding of said strap and causing rewinding thereof during normal movements of the user, a thrust member opposite one collar of said reel, said collar and said thrust member having opposed tapered sockets, inertia balls in said sockets, a spring interposed between said reel and said thrust member for urging the latter towards said collar to retain said inertia balls in said sockets, first gripping means provided on said thrust member and on one end of said casing, and second gripping means provided on the second of said reel collars and on the other end of said casing, said inertia balls acting, upon the acceleration of the strap outwardly of said reel beyond a predetermined rate, to roll within said tapered sockets to cause movement of said thrust member against said spring and away from said one reel collar, effecting actuation of said first gripping means and the binding of one end of said reel to said casing, further rolling of said balls in their sockets causing said reel to move axially within said casing and effect the actuation of said second gripping means and the binding of the other end of said reel to the other end of said casing, thereby locking both ends of said reel substantially simultaneously against outward movement while transmitting torsional stresses and resulting strains to both ends of said reel.

2. A safety harness device as defined in claim 1 wherein said first gripping means comprises internal serrations on one end of said casing extending towards said thrust member and serrations on said thrust member extending towards said casing serrations, said second gripping means comprising additional internal serrations on the other end of said casing extending toward said second reel collar and serrations on said second collar opposite said additional casing serrations and extending towards said additional casing serrations, and spring centering means interposing between the other end of said casing and said reel for normally positioning said reel so that said casing serrations do not engage serrations of said thrust member or those of said second reel collar, the locking of said safety harness device resulting from relative movement of said inertia balls with respect to said reel and said thrust member being effective to initially cause the serrations of said thrust member to engage the serrations on one end of said casing and almost simultaneously thereafter the axial shifting of said reel against the pressure of said centering spring to cause the serrations of said second reel collar to engage said additional casing serrations.

3. A safety harness device as claimed in claim 2 wherein manually operable means is provided in said casing to engage and hold said thrust member against turning to effect the rolling of said inertia balls in their sockets when said strap is pulled outwardly thereby locking said safety harness, the co-operating sockets of said first reel collar and said thrust member for receiving and supporting said ball members being tapered at one end thereof, the taper of a socket of said first reel collar being at the opposite side of a ball from the taper of the opposed socket of said thrust member.

4. A safety harness device of the character described comprising a casing having end walls, two independently rotatable reels within said casing disposed in axial alignment and arranged for limited axial movement, bearing means within said casing supporting the opposed inner ends of said reels while acting to convey thrust between these inner ends, additional bearing means within said casing and fixed upon the end walls thereof for supporting the outer ends of said reels, straps wound on said reels and extending outwardly of said casing for connection to the user, and thrust members interposing between the outer ends of said reels and said casing end walls, said thrust members and said reels having inertia means interposed therebetween and responsive to angular acceleration of said reels, excessive acceleration of a strap due to rapid movement of the user causing the reel associated with such strap to operate its associated inertia means to effect axial outward movement of its thrust member so that the latter grips the end wall of the casing to stop such reel, and substantially simultaneously the pressure of said thrust member on the casing end wall serves to shift said reel axially and, through said first named bearing means, acts to also shift said other reel so that its thrust member grips the other casing end wall, thereby also stopping said other reel.

5. A safety harness device as defined in claim 4 wherein said thrust members and said casing end walls have opposing gripping serrations, and centering springs interposed between the outer ends of said reels and said casing end walls acting to normally position said reels centrally within said casing so that said opposing serrations do not engage and enabling free movement of said straps, the operation of said inertia means of one reel causing a gripping of its thrust members with an end wall and simultaneously serving to move said reel end-wise, deflecting said centering springs and moving the other reel and its thrust member into gripping relation with the casing other end wall.

References Cited by the Examiner

UNITED STATES PATENTS

| | | | |
|---|---|---|---|
| 324,670 | 8/85 | Doolittle | 254—159 |
| 395,681 | 1/89 | Aitken | 188—71 X |
| 1,308,480 | 7/19 | Caouette | 254—157 |
| 1,757,241 | 5/30 | Forse | 242—74 |
| 2,899,146 | 8/59 | Barecki | 242—107.4 |
| 3,058,687 | 10/62 | Bentley | 242—107.4 |
| 3,111,283 | 11/63 | Conrad | 242—74 |

MERVIN STEIN, *Primary Examiner.*

STANLEY N. GILREATH, *Examiner.*